Sept. 16, 1924.

H. L. BLOOD

SYSTEM OF MOTOR CONTROL

Filed Nov. 8, 1920

1,508,770

Inventor
Harold L. Blood,
By S. Jay Teller
Attorney

Patented Sept. 16, 1924.

1,508,770

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

SYSTEM OF MOTOR CONTROL.

Application filed November 8, 1920. Serial No. 422,592.

*To all whom it may concern:*

Be it known that I, HAROLD L. BLOOD, a citizen of the United States, residing at Plainfield, in the county of Union and State of New Jersey, have invented certain new and useful Improvements in Systems of Motor Control, of which the following is a specification.

This invention relates to a system of motor control and particularly to a system of motor control for alternately operating a pair of electric motors.

An object of the present invention is to provide electric circuits for a motor system involving a pair of motors which are operated individually and alternately to each other.

Another object of the invention is to stop and start the motors alternately, the stopping of one motor serving at the same time to start the other motor.

Another object of the invention is to provide mechanism to start the operation of the first motor when the circuit for the second motor is opened and to start the second motor when the circuit for the first motor is opened. That is, one motor first operates through a predetermined cycle and is there stopped by mechanism operated by this motor. As soon as this first motor stops, the second motor starts and, after operating through its predetermined cycle is stopped by mechanism which is operated by the second motor. As soon as the second motor stops, the first motor is again started. This alternate operation of the two motors through their respective predetermined cycles is maintained throughout the operation of the system. Another feature of the motor system that is advantageous is that while it is in operation the motors are alternately operated by the opening and closing of their armature circuits, the armature circuit for one motor also including a starting resistance and also a dynamic braking circuit so that this motor may start slowly and be quickly brought to a stop at the end of its cycle.

The invention is particularly adapted for the control of electric motors operating machine tools in which one of the motors operates one mechanism or part of the tool and the other motor operates another mechanism or part of the tool. The circuits forming the motor system illustrated are designed particularly for a machine tool having two principal mechanisms, one of which must be completed before the second one starts, and, as soon as the second one stops the first mechanism must be again operated, this alternate operation of the mechanisms continuing throughout the operation of the tool so long as the circuit is in operation.

In the embodiment of the invention illustrated, it is assumed that there are but two principal mechanisms or functions to be accomplished, but the invention may be applied to machines having more than two principal mechanisms and functions.

To alternately start and stop the motors in the specific embodiment of the invention illustrated, I provide a drum on which is mounted a cam adapted to open and close a switch in a controller circuit which in turn operates the main control switches. This drum or other device carrying the cam is mounted to be rotated by either motor so that when either motor is in operation the drum is rotated by that particular motor.

It is obvious, however, that other mechanism or mechanisms may be provided which may be operated by the motors to alternately operate the motors during their respective operative cycles and then bring them to a stop.

In the accompanying diagrams annexed hereto and forming a part of this specification, I have shown my invention embodied in a metal cutting tool, but it will be understood that the invention can be otherwise embodied and that the drawings are not to be construed as defining or limiting the scope of the invention, the claims appended to this specification being relied upon for that purpose.

Figure 1:
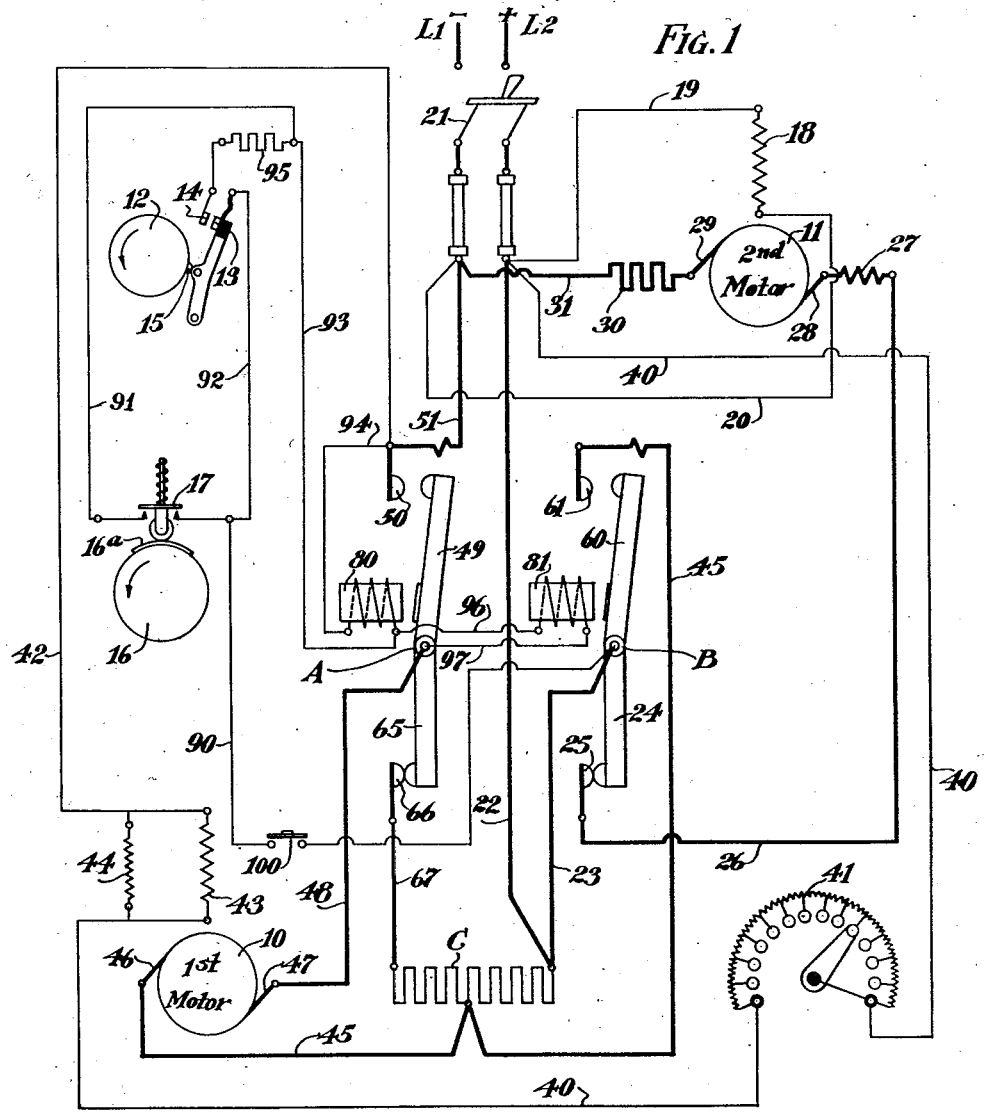
Figure 1 shows a characteristic wiring diagram for a motor system adapted to accomplish the above objects.

Briefly, my invention comprises, first; two motors, each adapted to drive a different part or mechanism of the same machine, second; two main control switches or other means to open and close the motor circuits, and third; mechanisms operated by the two motors for controlling the operation of said main switches or other means to open and close the motor circuits.

The motor circuits are controlled, in the embodiment of the invention illustrated, by two main switches. Normally the arms of the switches are held in the position shown in Fig. 1 by suitable springs or by gravity and the arms of the switches are moved to their opposite closed positions by the magnetic pull of solenoids to be more fully described hereafter.

The two motors of the machine operate suitable mechanism which in turn opens and closes a circuit controlling the solenoids of the main switches. One of the moving parts operated by the first motor is provided with a cam which opens a switch at each revolution of the part and maintains its switch closed during the remaining part of the revolution. The other cam is controlled by suitable means, first being operated by one motor and then by the other motor, the arrangements of these connections for the cam being such that it always rotates in the same direction and holds its switch open during a considerable part of its revolution.

The particular machine for which the present circuit has been devised is a machine tool, one motor being used to operate the cutter and the other motor to feed or suitably position the work. After a series of cuts taken by operation of the first motor, the cutter and its motor are stopped and the work positioned for further cutting operations. This work positioning is accomplished by the second motor, and, as soon as the work has been re-positioned, the indexing or positioning motor is stopped and the cutter motor re-started.

It is essential for the operation of the machine for which the present motor controlling mechanism has been devised that each motor must complete a predetermined cycle before it stops and as soon as either motor stops, the other must be started.

It is to accomplish this alternate operation of the motors, each motor operating sufficiently to accomplish its function and, in stopping start the other motor that forms the primary object of the invention.

The particular mechanism operated first by one motor and then by the other to open and close a controller circuit is but one of the embodiments of the invention and that other mechanism or mechanisms may be provided to control the starting and stopping of the motors.

Referring more particularly to the diagrams shown in the drawing, an embodiment of the invention is shown in which two motors 10 and 11 are alternately operated. In the particular circuit shown, motor 10 is coupled to and operates the machine parts performing one function of the machine and the motor 11 operates the parts of the machine performing the second function.

As this application is limited to the electric circuits utilized in the machine, it will not be necessary to particularly define the machine structure, suffice it to say that the main motor 10 is utilized to operate the cutter and the auxiliary motor 11 is used to position and feed the work.

Coupled to and rotated by the motor 10 is a cam 12, preferably this rotates in timed relation to the reciprocations of the cutter and serves to break the contacts 13 and 14 of a switch at a definite point in the stroke of the cutter. As shown, the cam 12 maintains the contacts 13 and 14 closed except during an instant of time when the arm on which contact 13 is mounted is pressed away from contact 14 by the raised point 15 on cam 12.

Another cam shown at 16ª is rotated, as above stated, alternately by the motors 10 and 11 always in the same direction and serves to open and close the switch 17. Any desired means may be utilized to rotate this cam 16ª, the preferred method being to drive it together with the drum 16 on which it is mounted by suitable ratchets, shown diagrammatically in Fig. 2 so that it is driven first by motor 10, and, when motor 10 is stopped and motor 11 started driven by this latter motor.

Figure 2:
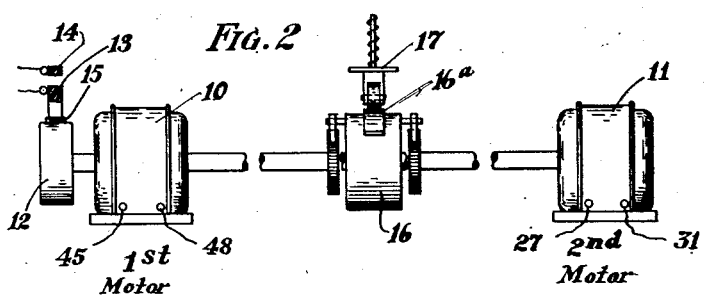
Fig. 2 shows, diagrammatically, the connections between the motors and the controlling mechanisms.

As shown diagrammatically in Fig. 2, the drum 16 carrying the cam 16ª is shown in position to be driven by either motor 10 or 11 through the ratchets and pawls on either side of the drums 16. The connections between the motors 10 and 11 and their respective ratchet wheels are not shown. These may comprise any suitable gearing permitting the motors 10 and 11 to make a plurality of revolutions while the ratchet wheel connected to that motor makes but one revolution. The connection between the motors and their respective ratchet wheels is also a positive connection so that each motor operates through a predetermined cycle before the cam drum 16 and cam 16ª rotate through a complete revolution.

When the main switches A and B are in the position shown, the motor 10 is stopped and the motor 11 is in operation. The circuit for this motor 11 will now be described.

The field circuit for motor 11 comprises a shunt field 18 which is always energized through conductors 19 and 20 as it is always across the line when the switch 21 is closed. The armature circuit for motor 11 includes conductors 22 and 23 extending from the positive terminal of the supply line to the pivot of switch B, thence through lower arm 24 to contact 25, then through conductor 26 to series field 27, and to one of the armature brushes 28. On the other side of the armature the circuit is completed by armature brush 29, armature resistance 30 and conductor 31 extending to the negative terminal of the supply line. As long as the switch B is held in the position shown motor 11 will be supplied with current, but, as soon as switch B is oscillated to separate lower arm 24 from contact 25 the armature circuit of motor 11 is broken, thus stopping it.

Motor 10 which, as above described, is of greater power than motor 11 is provided with the following circuits: Its field circuit is of the shunt type and includes conductor 40, in which is located a rheostat 41, and a conductor 42 extending to and joining a conductor in direct communication with the negative terminal of the supply circuit. The shunt field 43 in the above circuit is provided, also, with a choke resistance 44 across the terminals of the field 43. The shunt field 43 for motor 10 is always energized so long as the switch 21 across the line terminals is maintained in closed position.

As soon as switch A is oscillated to its opposite position, an armature circuit is completed for motor 10. This includes conductor 22, a portion of resistance C, conductor 45, armature brushes 46 and 47, conductor 48, upper arm 49 of switch A, contact 50 and conductor 51 extending to the negative terminal of the supply circuit. Preferably I make the switch B oscillate after switch A has oscillated so that an instant of time elapses after switch A oscillates before upper arm 60 of switch B closes its contact with contact 61. As soon as this takes place the portion of resistance C forming the starting resistance of motor 10 is shunted and the full line voltage is supplied to the armature brushes 46 and 47. This delayed action of switch B therefore permits the motor 10 to start with a resistance which, after an instant of time is cut out by the operation of switch B. With the switch B in its opposite position, the armature circuit for motor 10 comprises conductors 22 and 23, upper arm 60 of switch B, contact 61 and the entire length of conductor 45, thus eliminating the starting resistance C. On the opposite side of motor 10 the circuit is unchanged.

A dynamic braking circuit is also provided for the motor 10. This comprises conductor 48, lower arm 65 of switch A through contact 66, conductor 67, a portion of resistance C, part of conductor 45 and the armature of motor 10. As soon as the switch A is thrown to the position shown in the figure, which occurs when the operation of motor 10 is about to cease, the supply of current is interrupted by the separation of upper arm 49 of switch A from the contact 50 and conductor 51. The motor 10 on continuing to rotate is then compelled to operate as a generator forcing current through the circuit just mentioned which includes a large part of resistance C thus quickly bringing it to rest.

In order to automatically open and close the armature circuits above described, I provide the following control circuits: These are connected to the two switches A and B which in turn are thrown from one extreme position to the other by the action of solenoids energized by the controlling circuits.

Normally, as above stated, the switches A and B are held in the positions shown in the diagram by mechanical means, such as springs, or by gravity, the solenoids being energized periodically by the regulating circuit about to be described to throw the switches A and B to their opposite position. The solenoid 80 mounted adjacent switch A is supplied with current at the time when switch 17 is closed, this current being sufficient to energize solenoid 80 to throw switch A from the position shown in Fig. 1 to its opposite position. This circuit for energizing solenoid 80 comprises conductors 22 and 23 extending to the pivot of switch B, then through a conductor 90, through conductors 91 or 92 or both dependent upon whether switch 13 is closed as well as switch 17, and then to conductor 93, solenoid 80, conductor 94 and finally through conductor 51 to the negative terminal of the supply line.

Solenoid 81, which is adapted to throw the switch B, is not energized except when solenoid 80 has drawn the upper arm 49 of switch A to its closed position. As soon as the switch A has been oscillated to close the contact 50 with the upper arm 49 of switch A, the solenoid 81 is energized by current through a circuit including a terminal of solenoid 80 which is energized, a conductor 96 extending to the solenoid 81, and from the solenoid 81 the circuit extends through a conductor 97 where it joins the pivot of switch A which is connected with the negative main through arm 49 of switch A, contact 50 and conductor 51.

Conductor 92, in which is located switch 13 operated by cam 15, forms a branch of the controller circuit so that the switches 13 and 17 are in parallel and current can therefore flow through the controller circuit when either of these switches is closed.

A holding resistance 95 is inserted in conductor 92 on one side of the switch 13. This resistance 95 acts to prevent enough current passing through conductor 92 to energize solenoid 80 sufficiently to throw the switch A to its opposite position after switch 17 has once been opened. After switch 17 opens the controlling circuit continues to pass through conductor 92 until switch 13 opens, this current being sufficient to hold switch A in its opposite position. As soon as switch 13 opens the controller circuit is completely opened and both solenoids are de-energized, but, should cam 12 move to a point slightly beyond that shown, the controller circuit would again be closed. It is to prevent sufficient current through the controller circuit to throw switch A should the switch 13 close while the switch 17 is open that the resistance 95 is inserted.

In the operation of the characteristic circuit shown, the switch 13 is repeatedly opened and closed while the drum 16 makes but one revolution and therefore opens and closes the switch 17 but once. As long as the drum 16 maintains the switch 17 closed the opening and closing of switch 13 has no effect. As soon, however, as the switch 17 has opened, it is necessary for the controller circuit to be opened as soon as the motor 10 reaches a predetermined point in its cycle indicated by the position of cam 15 as shown in Fig. 1.

A push button or other manually controlled switch 100 is inserted in the control circuit conductor 90 so that the operation of the motors may be stopped by the operator. Normally this switch 100 is held closed, and, by raising it the control circuit is broken thus interrupting the circuit for the solenoids 80 and 81 and stopping operation of the motors. If the switch 100 is opened while the motor 11 is in operation at which time there is no current passing through conductor 90, the control is not affected until the motor 11 stops and the cam operated switch 17 closes. If, however, the push button switch 100 is opened while motor 10 is in operation at which time current passes through conductor 90 this motor is brought immediately to rest. This prevents the motor 11 being stopped during its normal operation but permits the motor 10, which operates the cutter of the machine, being stopped instantly at any time it is in operation.

In operation, as soon as the cam 16 occupies a position to close the switch 17, current passes through conductor 90 in the control circuit thus energizing the solenoid 80. This causes the switch A to oscillate to its opposite position thus closing the armature circuit for motor 10 and immediately afterward switch B oscillates thus opening the armature circuit for motor 11. The motor 10 continues to operate as long as the drum 16 permits the switch 17 to close. After the cam 16 opens switch 17, current continues to pass through the control circuit by way of conductor 92 until the switch 13 is opened by cam 12. When this takes place the control circuit is completely broken and the solenoids 80 and 81 are de-energized thus causing the switches A and B to move back again to the position shown. Both solenoids are simultaneously de-energized so that they move to the position shown in the diagram at the same time.

As soon as the solenoids 80 and 81 are de-energized the switches A and B of the main control switch are oscillated to the position shown in Fig. 1. This closes the armature circuit for the motor 11 thus starting it. Simultaneously the oscillation of switch A opens the armature circuit for motor 10 and closes the dynamic braking circuit.

What I claim is:

1. A motor control system comprising in combination, two motors, field and armature circuits therefor, two main switches for opening and closing said armature circuits, cam controlled means for operating said switches, movement of said switches in one direction opening the armature circuit of one motor and closing that of the other, and movement of the switches in the opposite direction opening the armature circuit of the second motor and closing that of the first.

2. In a motor control system, the combination with two motors, and two main switches for operating one of said motors when in operative positions and for operating the other motor when in released positions, of means comprising a cam member operated first by one motor and then by the other motor for alternately operating and releasing said main switches.

3. In a motor control system, the combination with two motors, and two main switches for operating one of said motors when in operative positions and for operating the other motor when in released positions, of means comprising a cam operated switch operated alternately by said motors and a second cam operated switch operated by one of said motors for alternately operating and releasing said main switches.

4. In a control system, the combination of a main and an auxiliary motor, and means comprising two main electro-magnetic switches for operating the two motors, one of said switches serving to operate the main motor and to complete a dynamic-braking circuit therethrough and the other switch serving to operate the auxiliary motor and to control the acceleration of the main motor.

5. In a control system, the combination of a main and an auxiliary motor, means comprising two electro-magnetic switches for operating the two motors, the first one of said switches serving to operate the main motor and to complete a dynamic-braking circuit therethrough and the second switch serving to operate the auxiliary motor and to control the acceleration of the main motor, means operated by the auxiliary motor for effecting operation of the first one of said switches, and means for insuring the operation of the second switch after the operation of the first switch.

6. In a control system, the combination of a main and an auxiliary motor, and means comprising two electro-magnetic switches for operating the two motors, one of said switches serving, when in an operative position, to complete an operating circuit through the main motor and serving, when in a released position, to complete a dynamic-braking circuit through the main motor, and the other switch serving, when in an operative position, to effect acceleration of the main motor and serving, when in a released position, to complete an operating circuit through the auxiliary motor.

7. In a control system, the combination comprising two motors, two electro-magnetic switches for controlling the operation of said motors and for completing a dynamic-braking circuit through one of the motors, said switches operating one motor when in operative positions and operating the other motor when in released positions, and means for automatically operating the switches to effect alternate operation of the two motors.

8. In a control system, the combination comprising a main and an auxiliary motor, two main electro-magnetic switches for controlling the operation of the two motors, means operated by the auxiliary motor for effecting energization of the two main switches to operate the main motor and to stop the auxiliary motor, and means operated by the main motor for releasing the main switches to stop the main motor and to start the auxiilary motor.

9. In a control system, the combination comprising a main and an auxiliary motor, two main electro-magnetic switches for controlling the operation of the two motors, means operated by the auxiliary motor for effecting operation of the two main switches to stop the auxiliary motor and to start and accelerate the main motor, and means operated by the main motor for releasing the two main switches to open the circuit of the main motor, complete a dynamic-braking circuit therethrough and to start the auxiliary motor.

10. In a control system, the combination of two motors, two main electro-magnetic switches for controlling the operation of said motors, two auxiliary switches, one of said auxiliary switches being operated by one of said motors to effect operation of the two main switches and the other auxiliary switch being operated by the other motor to effect release of the two main switches.

11. In a control system, the combination with a main and an auxiliary motor, two main electro-magnetic switches, and two auxiliary switches for controlling the main switches, of a cam member operated by the main motor for operating one of the auxiliary switches to release the two main switches and effect operation of the auxiliary motor, and a cam member operated by the auxiliary motor for operating the other auxiliary switch to operate the two main switches and operate the main motor.

12. In a control system, the combination comprising a main electro-magnetic switch, two cam-operated switches in the energizing circuit of said main switch, and means for so connecting said cam-operated switches as to effect operation of the main switch only when a predetermined one of the cam-operated switches is operated and to effect release of the main switch only when both of the cam-operated switches are released.

13. In a control system, the combination with two motors and two main electro-magnetic switches for controlling the operation of said motors, of two auxiliary switches for controlling the operation of said main switches, and means for so connecting said auxiliary switches as to effect operation of the main switches only when a predetermined one of the auxiliary switches is operated and to effect release of the two main switches only when the two auxiliary switches are in released position.

In testimony whereof, I hereto affix my signature.

HAROLD L. BLOOD.